United States Patent [19]

Anderson

[11] 4,238,383

[45] Dec. 9, 1980

[54] VULCANIZABLE SHOE SOLING COMPOSITION

[75] Inventor: Thomas J. Anderson, Windsor, Vt.

[73] Assignee: The Goodyear Tire & Rubber Company, Akron, Ohio

[21] Appl. No.: 948,839

[22] Filed: Oct. 5, 1978

[51] Int. Cl.³ .............................................. C08K 5/01
[52] U.S. Cl. .......................................... 260/33.6 AQ
[58] Field of Search ................... 260/33.6 AQ, 876 B, 260/894; 525/87

[56] References Cited

U.S. PATENT DOCUMENTS

| | | | |
|---|---|---|---|
| 3,196,126 | 7/1965 | Wald | 260/33.6 AQ |
| 3,322,856 | 5/1967 | Holden et al. | 260/876 B |
| 3,352,944 | 11/1967 | Wheat | 260/876 B |
| 3,365,416 | 1/1968 | Vittorelli et al. | 260/894 |
| 3,576,911 | 4/1971 | Maxey | 260/876 B |
| 4,049,595 | 9/1977 | Dominguez | 260/33.6 AQ |

*Primary Examiner*—Lewis T. Jacobs
*Attorney, Agent, or Firm*—J. D. Wolfe

[57] ABSTRACT

A shoe soling composition of vulcanizable type composed of a blend of high cis polybutadiene, elastomeric copolymer of styrene/butadiene containing 22.5 to 24.5 mol percent of styrene and a thermoplastic block copolymer of styrene/butadiene, plasticized with hydrocarbon process oil and a synthetic resin and reinforced with a powdered silica.

1 Claim, No Drawings

VULCANIZABLE SHOE SOLING COMPOSITION

TECHNICAL FIELD

This invention relates to a new vulcanizable composition which can be sheeted or molded to give vulcanized compositions having unique properties as shoe soling.

BACKGROUND ART

Shoe soling made from leather is relatively expensive and has certain defects relative to moisture resistance. The natural rubber and synthetic rubber shoe sole compositions have a number of deficiencies such as poor slip resistance, a hard harsh feel and when compounded to overcome the hard harsh feel then the tear resistance and wear properties are not as desirable.

DISCLOSURE OF INVENTION

This invention provides a vulcanizable elastomer composition having a good feel, excellent wear and slip resistance and a customer appealing appearance. The vulcanizable elastomeric compositions of this invention comprise a blend on a weight basis of 40 to 70 parts of polybutadiene of at least 93 percent cis content, 23 to 53 parts of a copolymer of styrene-butadiene containing 22.5 to 24.5 mol percent of styrene and a thermoplastic block copolymer of styrene-butadiene compounded with 15 to 35 parts of a finely divided silica filler, 5 to 30 parts of a hydrocarbon processing oil and 10 to 30 parts of a hydrocarbon resin obtained as a polymer or copolymer of less than 10 carbon atoms and an effective amount of a sulfur curative.

This vulcanizable composition can be made by compounding the above ingredients in a Banbury TM mill and then sheeting and curing the sheet or molding and vulcanizing the composition into the desired soling component or related products. Normally the vulcanizing time and temperature can vary, as is well known to the rubber compounder, with a typical time being 5 to 20 minutes at 149° to 177° C. Also, the rubber compounder appreciates an effective amount of sulfur curative is necessary, with preferably 1.5 to 3.0 parts sulfur being used, with varying amounts of the well known accelerators.

Best Mode for Carrying out the Invention

The nature of this invention and its advantages can be more readily appreciated by reference to the representative and illustrative examples wherein all parts and percentages are by weight unless otherwise indicated.

Example 1

The ingredients shown in Table I below were compounded in a Banbury TM and sheeted out into a sheet. Then shoe soles were die stamped from the sheet and molded at 165° to 170° C. for 11 minutes.

TABLE I

| Ingredients | Parts by Weight |
| --- | --- |
| Polybutadiene, 96% cis content | 50.0 |
| Copolymer of styrene/butadiene (23.5 mol % styrene) | 43.0 |
| Thermoplastic block copolymer of styrene/butadiene | 8.0 |
| Hydrocarbon resin | 20.0 |
| Pyrophoric silica, powdery | 25.0 |
| Stearic acid | 1.50 |
| Sulfur | 2.50 |
| Mercaptobenzothiazole | 1.0 |
| Light process oil | 13.0 |

The shoe sole made with the above recipe had a Rex A hardness of about 40, good flexibility high abrasion resistance in walk tests, excellent resistant to slip on surfaces to which the commercial synthetic soles have poor resistance. Also, the soling had a light color and excellent customer appeal. Generally soling of Rex A hardness of 35 to 45 gives good results on walk tests. Thermoplastic block copolymers of styrene/butadiene are well known and available as Kraton 1101, a trademark of Shell Oil Company, and is preferred block copolymer.

While certain representative embodiments and details have been shown for the purpose of illustrating the invention it will be apparent to those skilled in this art that various changes and modifications may be made therein without departing from the spirit or scope of the invention.

I claim:

1. A vulcanizable elastomer composition comprising a blend on a weight basis of 40 to 70 parts of polybutadiene of at least 93 percent cis content, 23 to 53 parts of a copolymer of styrene/butadiene containing 22.5 to 24.5 mol percent of styrene and a thermoplastic block copolymer of styrene/butadiene compounded with from 15 to 35 parts of a silica filler, 5 to 30 parts of a hydrocarbon processing oil and 10 to 30 parts of a hydrocarbon resin obtained as a polymer or copolymer of olefins of less than 10 carbon atoms and an effective amount of a sulfur curative exhibiting in a vulcanized state good abrasion, slip resistance and flexibility and having a Rex A hardness of 30 to 45.

* * * * *